United States Patent
Hu et al.

(10) Patent No.: US 7,246,143 B2
(45) Date of Patent: Jul. 17, 2007

(54) TRACED FAST FOURIER TRANSFORM APPARATUS AND METHOD

(75) Inventors: Zhong Hu, Falls Church, VA (US); Prakash Chakravarthi, Gaithersburg, MD (US)

(73) Assignee: Comsat Corporation, Bethesda, MD (US)

(*) Notice: Subject to any disclaimer, the term of this patent is extended or adjusted under 35 U.S.C. 154(b) by 565 days.

(21) Appl. No.: 09/980,780

(22) PCT Filed: Apr. 9, 2001

(86) PCT No.: PCT/US01/08646

§ 371 (c)(1),
(2), (4) Date: May 3, 2002

(87) PCT Pub. No.: WO01/78290

PCT Pub. Date: Oct. 18, 2001

(65) Prior Publication Data

US 2003/0225806 A1 Dec. 4, 2003

Related U.S. Application Data

(60) Provisional application No. 60/196,028, filed on Apr. 7, 2000.

(51) Int. Cl.
*G06F 17/14* (2006.01)

(52) U.S. Cl. .................................................. 708/404
(58) Field of Classification Search ........ 708/403–404, 708/409, 321
See application file for complete search history.

(56) References Cited

U.S. PATENT DOCUMENTS

| 4,100,604 | A | * | 7/1978 | Perreault | ............... 708/821 |
| 5,671,168 | A | * | 9/1997 | Liu et al. | ............... 708/321 |
| 6,169,723 | B1 | * | 1/2001 | Fertner et al. | ............... 370/210 |

* cited by examiner

*Primary Examiner*—Tan V. Mai
(74) *Attorney, Agent, or Firm*—Sughrue Mion, PLLC

(57) ABSTRACT

A Fast Fourier Transform (FFT) arrangement for use in those situations in which not all of the outputs are desired is controlled in such a fashion that at least those multiplications (and possibly those additions) are not performed which do not contribute toward the desired outputs. The technique is usable in those situations in which the desired output signals are noncontiguous, or are in noncontiguous bins. The technique includes signal preprocessing in which the indices are adjusted so that the index for a particular stage points to those butterflies of the previous stage which contribute toward its output. The FFT is performed on the indexed data. In one embodiment, a pipelined FFT processor is controlled in a corresponding manner.

10 Claims, 10 Drawing Sheets

FIG. 8A  START TIME 0:   A:  0 1 2 3 4 5 6 7 8 9 10 11 12 13 14 15
                13 14 15
FIG. 8B  START TIME 1:   B:  0 2 4 6 8 10 12 14
                         C:  1 3 5 7 9 11 13 15
FIG. 8C  START TIME 3:   D:  0 2 4 6 8 10 12 14
                         E:  1 3 5 7 9 11 13 15
FIG. 8D  START TIME 3:   F:  0 2 4 6 8 10 12 14
                         G:    1 3 5 7 9 11 13 15
FIG. 8E  SW1:   STRAIGHT THROUGH / CRISSCROSS
FIG. 8F  START TIME 3:   H:  0 1 4 5 8 9 12 13
                         I:    2 3 6 7 10 11 14 15
FIG. 8G  START TIME 6:   J:  0 1 4 5 8 9 12 13
                         K:  2 3 6 7 10 11 14 15
FIG. 8H  START TIME 8:   L:  0 1 4 5 8 9 12 13
                         M:    2 3 6 7 10 11 14 15
FIG. 8I  SW2:   STRAIGHT THROUGH / CRISSCROSS
FIG. 8J  START TIME 8:   O:  0 1 2 3 8 9 10 11
                         P:      4 5 6 7 12 13 14 15
FIG. 8K  START TIME 12:  Q:  0 1 2 3 8 9 10 11
                         R:  4 5 6 7 12 13 14 15
FIG. 8L  START TIME 12:  S:  0 1 2 3 8 9 10 11
                         T:          4 5 6 7 12 13 14 15
FIG. 8M  SW3:   CRISSCROSS STRAIGHT THROUGH
FIG. 8N  START TIME 12:  U:  0 1 2 3 4 5 6 7
                         V:          8 9 10 11 12 13 14 15
FIG. 8O  START TIME 18:  W:  0 1 2 3 4 5 6 7
                         X:  8 9 10 11 12 13 14 15

TRACED FAST FOURIER TRANSFORM APPARATUS AND METHOD

CLAIM OF PRIORITY

This application claims priority of provisional application 60/196,028, filed Apr. 7, 2000.

FIELD OF THE INVENTION

This invention relates to fast FFT, and more particularly to techniques for such FFT which eliminate the need to perform at least certain multiplications and/or additions, when those multiplications and/or additions are not necessary to the generation of particular unwanted ones of the set of outputs.

BACKGROUND OF THE INVENTION

The Fast Fourier Transform (FFT) is widely used for generation of spectrum information from sets of data which vary in time (spectral analysis), and in the reverse direction for determining the time function which is equivalent to a particular spectrum (filtering). The FFT is widely used in communications applications such as in demultiplexing, and is generally described by Brigham in "The Fast Fourier Transform and its Applications", Prentice-Hall, 1988. In its demultiplexing role, the algorithm is used in multicarrier demultiplexing, as described by Crochiere et al. in "Multirate Digital Signal Processing, Prentice-Hall, 1983. The FFT can be implemented as a decimation-in-time function or as a decimation-in-frequency (DIF) function or algorithm, and can be implemented in hardware, in software running on a general-purpose processor, or as a pipelined structure adapted for the application. The pipelined structure is very advantageous for many applications.

FIG. 1 is an illustration of the transposed canonical signal flow graph 10 which is ordinarily used to explain the operation of the FFT. In FIG. 1, the flow graph includes a plurality $2^S$ of input nodes or points at the left of the FIGURE, where S is an integer representing the number of FFT stages. The value of $2^S$ is sixteen in the particular example of FIG. 1, and these input nodes or points are numbered 0 to 15. There are similarly sixteen output ports at the right, numbered in like fashion. Lying between the input and output ports are S stages of butterflies, where S=4 in this example. The first stage (stage 1) of butterflies has paired inputs and outputs, so that the sixteen input ports are coupled to eight individual butterfly groups. In particular, input nodes 0 and 1 are coupled to a first butterfly, designated 0, of the first butterfly group of stage 1. Similarly, input nodes 2 and 3 are coupled to a second butterfly of the second butterfly group of stage 1, input nodes 4 and 5 are coupled to a third butterfly group of stage 1, input nodes 6 and 7 are coupled to a fourth butterfly group of stage 1, and so forth. Each of the butterfly groups in the first stage includes a single butterfly, designated 0 at the crossing of the two lines of the butterfly. The last butterfly group of stage 1 is the eighth butterfly group, which is connected to input nodes 14 and 15. Each butterfly group of stage 1 of FIG. 1 has a pair of output nodes. In FIG. 1, the output nodes of the first butterfly are designated 0 and 1, the output nodes of the second butterfly are designated 2 and 3, the output nodes of the third butterfly group are designated 4 and 5, the output nodes of the fourth butterfly group are designated 6 and 7, the output nodes of the fifth butterfly group are designated 8 and 9, the output nodes of the sixth butterfly group are designated 10 and 11, and the output nodes of the seventh butterfly group are designated 12 and 13. The output nodes of the eighth butterfly group are designated 14 and 15.

The output sum (+) and difference (−) signals from each butterfly group of the first stage of FIG. 1 appear at first-stage output nodes 0 through 15, corresponding to the second-stage input nodes, which are grouped into sets of four. Thus, first-stage output ports 0, 1, 2, and 3 correspond to input ports 0, 1, 2, and 3 of the first butterfly group of the second stage of butterflies. First stage output ports 4, 5, 6, and 7 correspond to second-stage input ports 0, 1, 2, and 3 of the second group of butterflies of the second stage. First-stage output ports 8, 9, 10, and 11 correspond to input ports 0, 1, 2, and 3, respectively, of the third set of butterflies of the second stage. Lastly, output ports 12, 13, 14, and 15 of the first stage of butterflies correspond to input ports 0, 1, 2 and 3 of the fourth set of butterflies of the second stage. The second stage of butterflies is thus seen to be divided into four groups, each containing two butterflies, designated 0 and 1. The first and third inputs of each butterfly group of the second stage share the first butterfly of the group, namely the one designated 0, and the second and fourth inputs share a second butterfly, namely the one designated 1. This is true for each of the four groups or sets of butterflies of the second stage of FIG. 1.

In the arrangement of FIG. 1, the third-stage butterflies are grouped into two sets, each having its input ports numbered from 0 to 7. Thus, output port 0 of the first butterfly group of stage 2 is connected to or corresponds to input port 0 of the first group or set of butterflies of stage 3, output port 1 of the first butterfly group of stage 2 corresponds to input port 1 of the first butterfly group of stage 3, output port 2 of the first butterfly group of stage 2 corresponds to input port 2 of the first butterfly group of stage 3, and output port 3 of the first butterfly group of stage 2 corresponds to input port 3 of the first group of butterflies of the third stage of butterflies. Output port 0 of the second butterfly group of stage 2 corresponds to input port 4 of the first stage of butterflies of stage 3, output port 1 of the second butterfly group of stage 2 corresponds to input port 5 of the first butterfly group of stage 3 of butterflies, output port 2 of the second group of butterflies of stage 2 corresponds to input port 6 of the first butterfly group of stage 3, and output port 3 of the second group of butterflies of stage 2 corresponds to input port 7 of the first butterfly group of stage 3. In a similar manner, output ports 8, 9, 10, and 11 of the third butterfly group of stage 2 correspond to input ports 0, 1, 2, and 3, respectively, of the second group of butterflies of the third stage of FIG. 1. Lastly, output ports 12, 13, 14, and 15 of the fourth butterfly group of stage 2 of FIG. 1 correspond to input ports 4, 5, 6, and 7, respectively. Thus, the third stage of butterflies is partitioned into two groups, namely the upper group of four butterflies, designated 0, 1, 2, and 3, associated with, or having, output ports 0 through 7, respectively, and the lower group of four butterflies, also designated 0, 1, 2, and 3, having output ports 8 through 15.

In FIG. 1, output ports or nodes 0, 1, 2, 3, 4, 5, 6, and 7 of the first butterfly group of stage 3 correspond to like-numbered input ports of the single butterfly group of stage 4, and output ports 8, 9, 10, 11, 12, 13, 14, and 15 of the second butterfly group of stage 3 correspond to like-numbered input ports of the single butterfly group of stage 4. Thus, the butterfly group of the last or fourth stage of butterflies is in one monolithic group, or in other words is not divided into groups, and its eight individual butterflies are designated 0 through 7. More particularly, butterfly 0 of the fourth-stage butterfly group is associated with output nodes 0 and 8, butterfly 1 is associated with output ports 1 and 9, butterfly 3 is associated with output ports 2 and 10, butterfly 4 is associated with output ports 3 and 11, butterfly 5 is associated with output ports 4 and 12, butterfly 6 is associated with output ports 5 and 13, butterfly 7 is associated with output ports 6 and 14, and butterfly 8 is associated with output ports 7 and 15.

FIG. 2a illustrates a single butterfly representation of a first type, which can apply to any one butterfly or line-crossing of FIG. 1, and FIG. 2b represents a different type of butterfly, which can also be used in the representation of FIG. 1. In FIG. 2a, the butterfly is of the type used with a decimation-in-frequency (DIF) FFT operation when applied to FIG. 1. The butterfly of FIG. 2b is of the type used with a decimation-in-time (DIT) FFT operation when applied to FIG. 1. FIG. 2a illustrates one butterfly representation, which can apply to any one butterfly of line-crossing of FIG. 1. In FIG. 2a, the butterfly is of a type used with a Decimation-in-frequency (DIF) FFT operation when applied to FIG. 1. In the arrangement of FIG. 2a, the butterfly 220 includes an input node coupled to an input port A, another input node coupled to another input port B, a + output node coupled to an output port C, and a further − output node coupled by way of a weighting or twiddle factor multiplier 222 to output port D. The butterfly 220 of FIG. 2a can be represented by the symbol designated 226.

In the arrangement of FIG. 2b, the butterfly 210 includes an input coupled to port A, and a second input node coupled to input port B. In addition, the + output node of the butterfly of FIG. 2b is coupled to an output port C, and the − output nod is coupled to output port D. A weighting or twiddle factor multiplier 214 is coupled between input port B and the lower input node 212 of butterfly 210. The butterfly of FIG. 2b can be represented by the symbol designated 216.

In operation of the flow graph of FIG. 1 for use with a prior-art FFT, the input data points are assumed to have been buffered, and a set of sixteen data points is available for application to the input nodes of the flow graph of FIG. 1. Thus, a particular complex number is applied to each input node 0 through 15.

In general, there are S stages, which number four in the arrangement of FIG. 1. At the $i^{th}$ stage (where $i \leq S$ and $i \geq 1$), there are $2^{S-i}$ butterfly groups, each group containing $2^{i-1}$ butterflies. The input ports of the $i^{th}$ stage butterfly group are labelled from 0 to $(2^i-1)$. Input port j ($0 \leq j \leq 2^i-1$) and $(j+2^{i-1} \% 2^i)$ share the same butterfly.

The operation of an FFT can be implemented in software. An illustrative example of a prior-art software for performing an FFT, in C language, is

```
void FFT(int N, int s, int **indexSet, complex
*x)
{    int i, j, j2, k;         //counters
     int nRep;      //Index spacing between
     adjacent butterfly Group
     int numBFL;         //number of Butterflies
per Group
     float twoPi;
     float ang;          //twiddle factor unit
phase
               float TWF;        // twiddle
factor
     float c,s;        //Cosine and Sine
storage variable
     complex tempData;
     Nrep=1;
     twoPi=2*3.14159265;
```

-continued

```
     for (i=0;i<s; i++)          //number of
stages loop
     {
               numBFL=Nrep; //number of
butterflies per group at stage s
               Nrep=2*nRep;
               ang=twoPi/nRep;
                    for (j=0;j<numBFL;j++)
                    {          //Calculate the
twiddle factors
                         TWF=ang*j;

c=cos(TWF);
                         s=sin(TWF);
                         //update the data
                         for (k=j; k<N; k+=nRep)

{j2=k+numBFL;
tempData=x(j2) *CMPLX(c,s);
                              x(j2) =x(k) − tempData;
                              x(k) =x(k) + tempData;
                              }
                         }
               }
     }
```

The underlined portions of the prior-art FFT processing are those in which changes are made to implement the method of the invention, as described below.

In general, the entire FFT is calculated in the prior art, even if only a few of the output points are required. There are applications in which the required FFT outputs are sparse, as for example in which the desired outputs correspond to only certain bins of the FFT output or in narrow frequency windows. In the multicarrier demodulation context, it might be desired to extract only one or a few noncontiguous carriers from the multicarrier input signal. FFT pruning is known for reducing the computational burden. Such pruning is described by Markel in "FFT pruning", published at pp 305-311 in the IEEE Transactions on Audio Electroacoustics, Vol. Au-19, December 1971; Skinner in "Pruning the decimation-in-time FFT algorithm," published at pp 193-194 of IEEE Trans. Acoustics, Speech, and Signal Processing, vol ASSP-24, April 1976; Sreenivas et al., in "FFT algorithms for both input and output pruning," published at pp 291-292 of IEEE Trans. Acoustics, Speech, and Signal Processing, vol ASSP-27, June 1979; Sreenivas et al., in "High-resolution Narrow-Band Spectra by FFT pruning," published at pp 254-257 of IEEE Trans. Acoustics, Speech, and Signal Processing, vol ASSP-28, April 1980; and Nagai, in "Pruning the decimation-in-time FFT Algorithm with frequency shift," at pp 1008-1010 of IEEE Trans. Acoustics, Speech, and Signal Processing, vol ASSP-34, August 1986. However, the pruning described in these sources appears to be applied only when the set of output points or bins is continuous, which is to say when the outputs are in continuous windows, or require special structures. It should be noted that, since the FFT is cyclic, outputs are (or can be considered to be) continuous when they extend from the highest-numbered back to zero. In our example, that is to say, that the output node or port group numbered 14, 15, 0, 1 is a continuous or contiguous group, since the transition between nodes numbered 0 and 15 is not considered to be discontinuous. On the other hand, the output node group 14, 0, 1 would be considered to be discontinuous, since a non-selected port (port 15) lies within the sequence.

Improved pruning techniques for FFT are desired.

SUMMARY OF THE INVENTION

A method according to an aspect of the invention is for fast fourier transform on a digital series to produce signals in cyclically noncontinuous output bins, by radix 2 FFT. The method comprises the step of determining the required outputs from such factors as the number $2^S$ of FFT points, the output bin index $O_S$, and the input signal array. The butterfly index for the last stage (stage S) of the transposed canonical flow graph is determined by $$\Psi_{S-1} = O_S \% \left(\frac{N}{2}\right) \quad (1)$$

where $\Psi_{S-1}$ represents the butterfly index for stage S. The butterfly index is, for example, represented by the numbers at the crossing point or crossings of butterflies of stage S=4 in FIG. 3. Following determination of the butterfly index for the first stage, the butterfly indices for all other stages are determined by $$\Psi_{l-1} = \Psi_l \% \left(\frac{N}{2^{S-l+1}}\right) \quad (2)$$

where:

$\Psi_{l-1}$ represents the butterfly index for stage l (l≠S); and l varies from 1 to (S−1).

The butterfly indices so determined are sorted or placed in ascending order if not already in ascending order. Finally, using the butterfly index, only those butterflies necessary for calculation of the output bins are calculated.

In a particular mode of the method of the invention suited for use with a pipelined FFT implementation, the step of calculating only those butterflies necessary for calculation of the output bins is performed by steps including setting the $(j+1)^{th}$ butterfly index set $\Psi_j$, where ($1 \leq j \leq S-1$) and mapping from the $(j+1)^{th}$ stage butterfly index set $\Psi_l$ to the $j^{th}$ stage memory bits $m_j^i$ ($1 \leq j \leq S-1$, $0 \leq i \leq 2^{j-i}-1$), by (a) for ($1 \leq j \leq S-1$), (memory bits for stage j)
  (i) if $k \in \Psi_j$ contains index k, where k is the upper index for the memory bit representation, then setting $m_j^k=1$, and
  (ii) if ($k \notin \Psi_j$), then setting $m_j^k=0$;
(b) for j=S, (memory bits for stage S or the last stage)
  (i) if ($k \in O_S$), or $O_S$ contains index k, then setting $m_j^k=1$.
  (ii) if ($k \notin O_S$), then setting $m_j^k=0$; and Controlling the operation of the j<u>th</u> stage of the pipelined FFT by control of the memory pair $m_j^i$ ($0 \leq i \leq 2^{j-1}-1$) and $m_j^{i+Y}$, ($Y=2^{j-1}$).

In one mode, the step of setting the butterfly index includes the steps, when $0 \leq i \leq (2^{j-1}-1)$, of:

controlling the active/sleep mode of the butterfly adder with $m_j^i$;

controlling the active/sleep mode of the butterfly subtractor with $m_j^{i+Y}$; and controlling the active/sleep mode of the butterfly multiplier in accordance with the Boolean OR of $m_j^i$ and $m_j^{i+Y}$.

BRIEF DESCRIPTION OF THE DRAWING

FIGS. 8a through 8o represent various signals which appear in the structure of FIG. 7 during representative operation;

DESCRIPTION OF THE INVENTION

Figure 1:
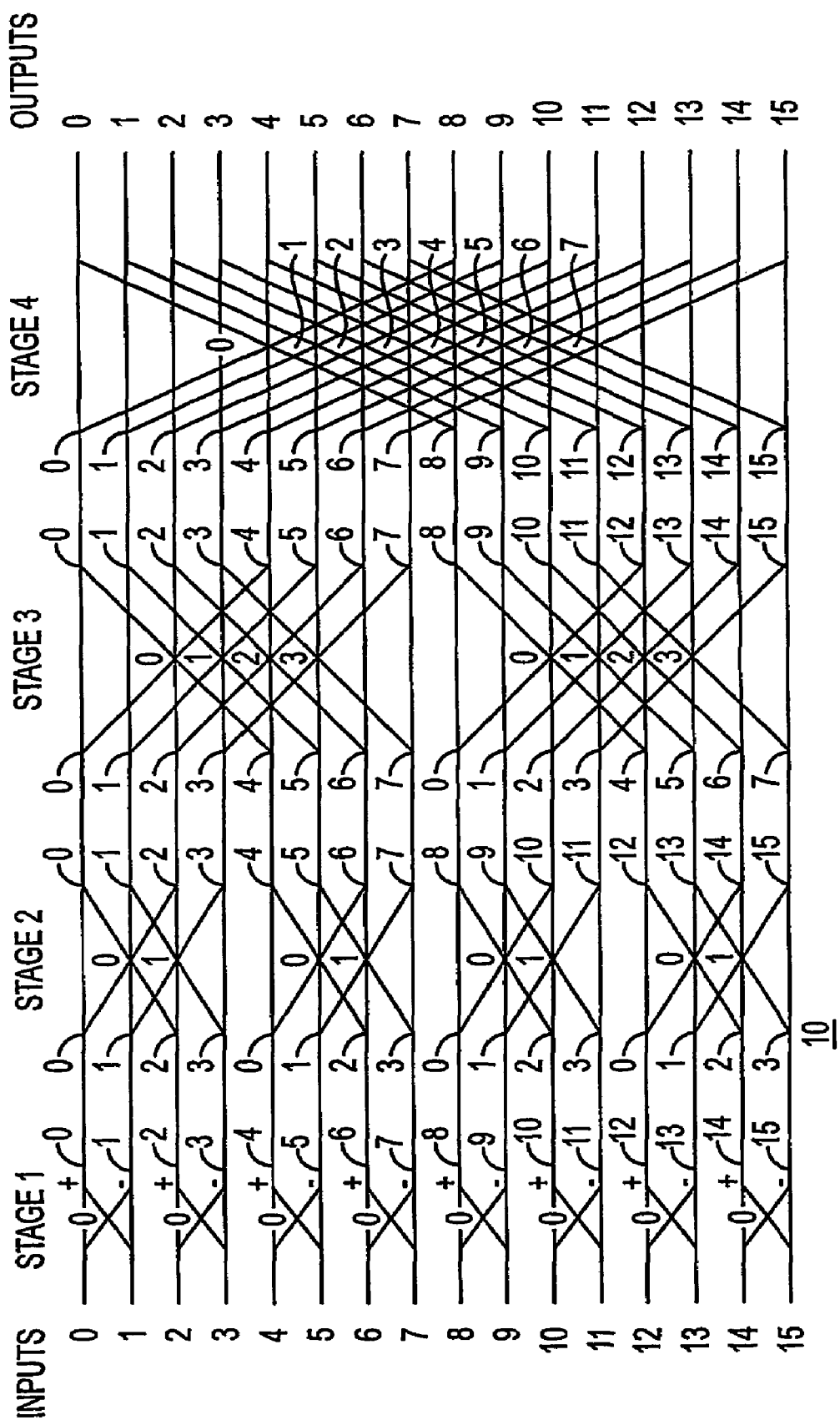
FIG. 1 is a simplified transpose canonical flow diagram of a prior-art arrangement for producing a fast fourier transform.
Figure 3:
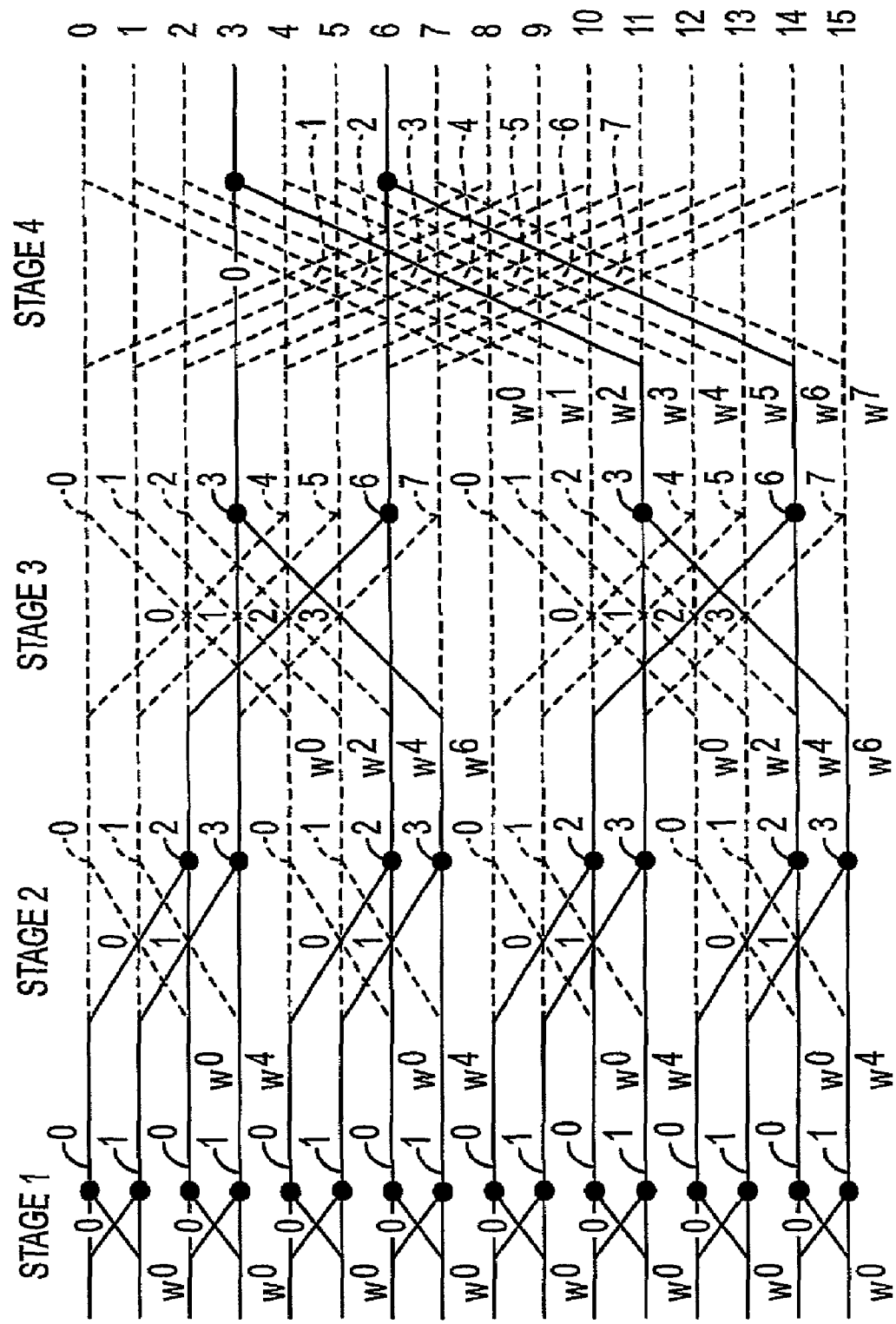
FIG. 3 is a simplified transpose canonical signal flow graph or chart for explaining preprocessing according to an aspect of the invention.

FIG. 3 is a simplified transpose canonical signal flow graph or diagram useful in explaining the preprocessing to reindex the butterflies for each stage in accordance with an aspect of the invention. It should be noted that, even though the flow graph of FIG. 3 is very similar to that of FIG. 1, it is used to describe preprocessing, rather than the operation of the FFT derivation. In FIG. 3, the fourth-stage outputs are designated 0 through 15, just as in FIG. 3. However, the application in this example requires only two output points, namely points 3 and 6. According to an aspect of the invention, the processing is modified in such a manner that only those multiplications associated with those butterflies which take part in producing the desired fourth-stage outputs on ports 3 and 6 are performed. Additions and subtractions require very small amounts of processing power. Ideally, the additions and subtractions associated with such non-used signals would also be eliminated. In accordance with another aspect of the invention, some of the ports or nodes of some of the stages of the structure of FIG. 3 are redesignated by comparison with the designations of FIG. 1. Also, some of the paths are shown as dotted lines, while other paths are solid lines. In particular, the output nodes of stage 1 of the butterfly array of FIG. 3 is renumbered from 0 through 15 to a sequence 0, 1, 0, 1 . . . 0, 1. Also, the output ports of the second stage of butterflies is renumbered from 0 through 15 as in FIG. 1 to the array 0, 1, 2, 3, 0, 1, 2, 3, . . . 0, 1, 2, 3. The output ports designated 0 through 15 of the third stage of butterflies of FIG. 1 is renumbered to 0 through 7, 0 through 7. The purpose of the redesignation of the nodes 5 or ports is to permit the program which processes the data to identify the paths which, when traced back, identify those nodes and butterflies which contribute toward the desired output signals. For example, one of the two selected output signals in the arrangement of FIG. 3 is that signal at output 3, designated by a large dot. Output 3 is in the same butterfly as output 11, which is not selected. Output node 3 of the fourth stage of butterflies connects by a solid line to output port 3 of the third stage of butterflies of both the upper and lower butterfly groups of stage 3. Similarly, output node 6 of the fourth stage of butterflies of FIG. 3 is identified by a large dot, and is connected by solid lines to output nodes 6 of both the upper and lower butterfly groups of stage 3. The advantage of the redesignation becomes apparent, in that the fourth stage butterflies contributing to the desired outputs can be determined from the third stage output node index.

Continuing with FIG. 3, those butterflies of the second stage of butterflies contributing toward the outputs 3 and 6 of the upper and lower butterfly sets of the third stage are identified by the same indices. More particularly, output node 3 of the uppermost butterfly set of the third stage is connected by solid lines to output port 3 of the uppermost butterfly set of the second stage of butterfly sets, and to output node 3 of the second butterfly set of the second stage. Similarly, output node 3 of the lowermost one of the butterfly sets of stage 3 is connected by solid lines to output nodes 3 of the third and fourth butterfly sets of stage 2. A similar examination reveals that output nodes 6 of the upper and lower butterfly sets of stage 3 of the structure of FIG. 3 are connected by solid lines to output nodes 2 of the four butterfly sets of stage 2. In this case, the "2" index can be determined as 6 modulo 4. In a very similar manner, using the calculation of 2 modulo 2=0, the "2" designated output ports of the second stage of butterflies are connected by solid lines to the "0" designated ports of the first stage. Using the calculation of 3 modulo 2=1, the "3" designated output ports or nodes of the second stage of butterfly sets are connected to the "1" output ports of the butterflies of the first stage. It will be noted that a large dot appears at each of the output ports of the butterfly groups of the first stage of FIG. 3. This means that all the outputs of the first stage of butterflies are used; however, in the remaining stages, less than all of the butterflies are used to generate the desired sparse results.

It should be noted that, in each stage of the structure of FIG. 3, the index identifying the output node for which an output signal is produced can be determined, at each stage, by the index itself, counted modulo. More particularly, at each stage, the desired-output index, counted modulo $2^{i-1}$, where i is the stage number. Thus, for the example of FIG. 3, in which 3 and 6 were selected as the desired outputs from the last stage, the butterflies of the output stage 4 which contribute toward the desired output signals are 3 modulo ($2^3$=8), and 6 modulo 8, corresponding to 3 and 6, respectively. This identifies those butterflies designated 3 and 6 in the output stage as contributing toward generating the desired signals. The remaining butterflies 0, 1, 2, 4, 5, and 7 of the output stage do not contribute toward the desired outputs. In the penultimate stage (stage 3) the 3- and 6-indexed output stage output node butterfly indices, counted modulo 4, give new indices 3 and 2, respectively. Thus, only butterflies 3 and 2 in the upper and lower butterfly sets or groups of stage 3 need to execute, and all the others may remain quiescent. In the antepenultimate stage, namely stage 2, the indices can be determined by output-stage indices 3 and 6, counted modulo 2, which correspond to 1 and 0, respectively. Thus, the butterflies required to execute in the second stage are those designated 0 and 1. In the first stage, the indices can be determined by output stage indices 3 and 6 counted modulo $2^0$=1, which generates 0 for all the output indices. Thus, all the butterflies of the first stage are required to execute. This completes the preprocessing of the signals in accordance with an aspect of the invention.

A "C" language program for performing preprocessing according to the above aspect of the invention is given by

```
void Preprocess(int **indexSet, int N, int s, int
*status)
{ int i, j, ctr;                           //dummy
loop counters
    int middleInd, Ind;       // the middle index and
end index
    middleInd=N;                  //initialization
        for(j=s-1; j>=0; j--)         //s stages FFT,
        start from the last stage
        { Ind=middleInd;                 // store
        end index
        middleInd= Ind/2 ;
        //The following for loops implement the
        algorithm mentioned above
                for (i=middleInd;i<Ind; i++)
                {
                    if (status[i])
                        status [i-middleInd]=1;
                }
            ctr=0;
        //The following for loops store the index
set to indexSet
                for (i=0;i<middleInd;i++)
                {
                    if (status[i])
                        indexSet[ctr++] [j]=1;
                }
            indexSet[ctr] [j]=EndOfList; / /set the tail
            of indexSet
            }
}
```

Figure 4:
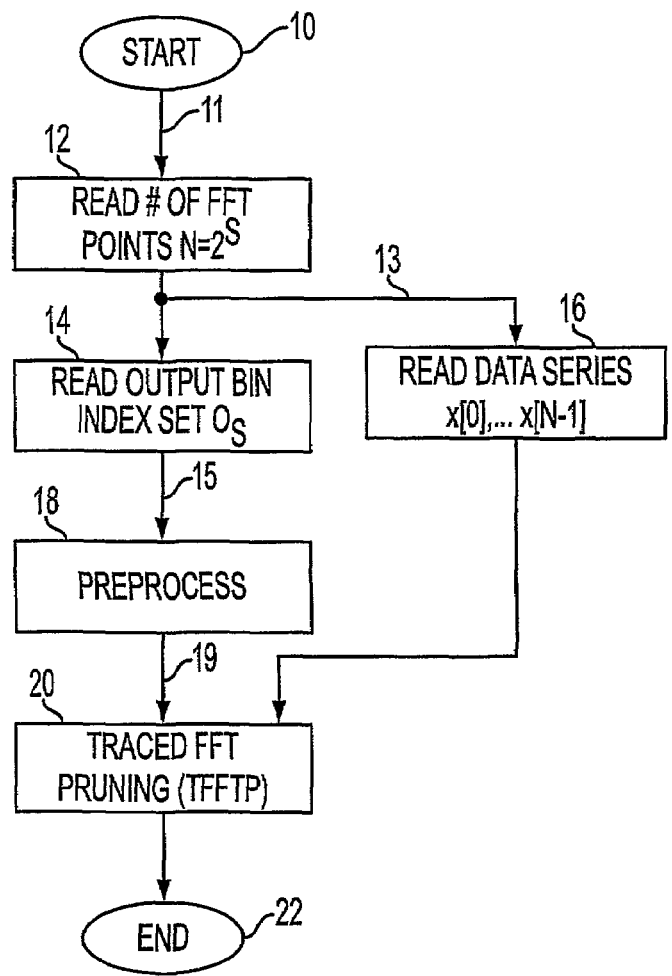
FIG. 4 is a simplified conventional logic flow chart or graph illustrating the overall logic flow according to the invention for producing an FFT output by steps including preprocessing and traced FFT processing.

A method according to the invention is illustrated in the flow chart or diagram of FIG. 4. In FIG. 4, the logic begins at START block 10, and proceeds to a block 12, which represents the reading of the number of FFT points, which is a number represented by $N=2^S$. From block 12, the logic flows to a block 14, representing the reading of the output bin index set $O_S$, and to a block 16, representing the reading of the N elements of the data series (the input data). The output bin index set is a representation of the output bins for which the FFT is desired, and the other bins are unwanted information. From block 14, the logic proceeds to a preprocessing step illustrated as a block 18, in which the various indexes are processed by modulo counting, as described in conjunction with FIG. 3. From blocks 16 and 18, the logic flows to a further block 20, which represents traced FFT pruning, to produced the desired FFT data in the selected output bins. From block 20, the logic flows to an END block 22.

Figure 5:
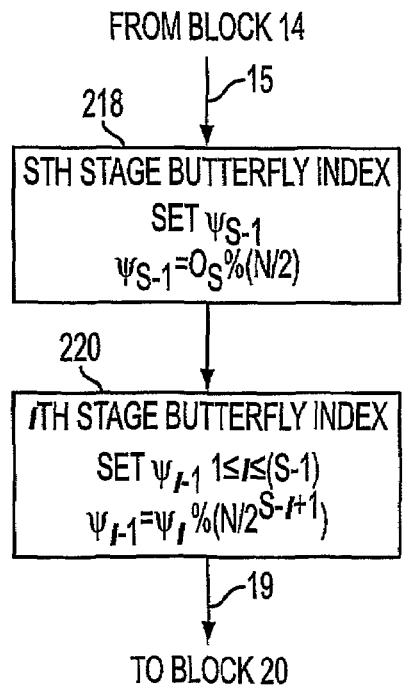
FIG. 5 is a simplified conventional logic flow chart of graph illustrating the logic flow for the preprocessing of FIG. 4.

FIG. 5 is a simplified logic flow chart or diagram illustrating the logic for implementing block 14 of FIG. 4. In FIG. 5, the logic arrives from logic path 15 at a block 218, which represents the generation of the $s^{th}$ stage butterfly index set $\Psi_{s-1}$ $$\Psi_{s-1}=O_S\%(N/2) \quad (3)$$

where $O_S\%$ (x) represents the result operating on $O_S$ modulo x. From block 218 of FIG. 5, the logic flows to a further block 220, which represents generation of the $l^{\text{th}}$ stage butterfly index $\Psi_{l-1}$ $$\Psi_{l-1} = \Psi_l \% \left(\frac{N}{2^{S-l+1}}\right) \qquad (4)$$

From block 220, the logic proceeds by way of logic path 19 to block 20 of FIG. 4.

Figure 6:
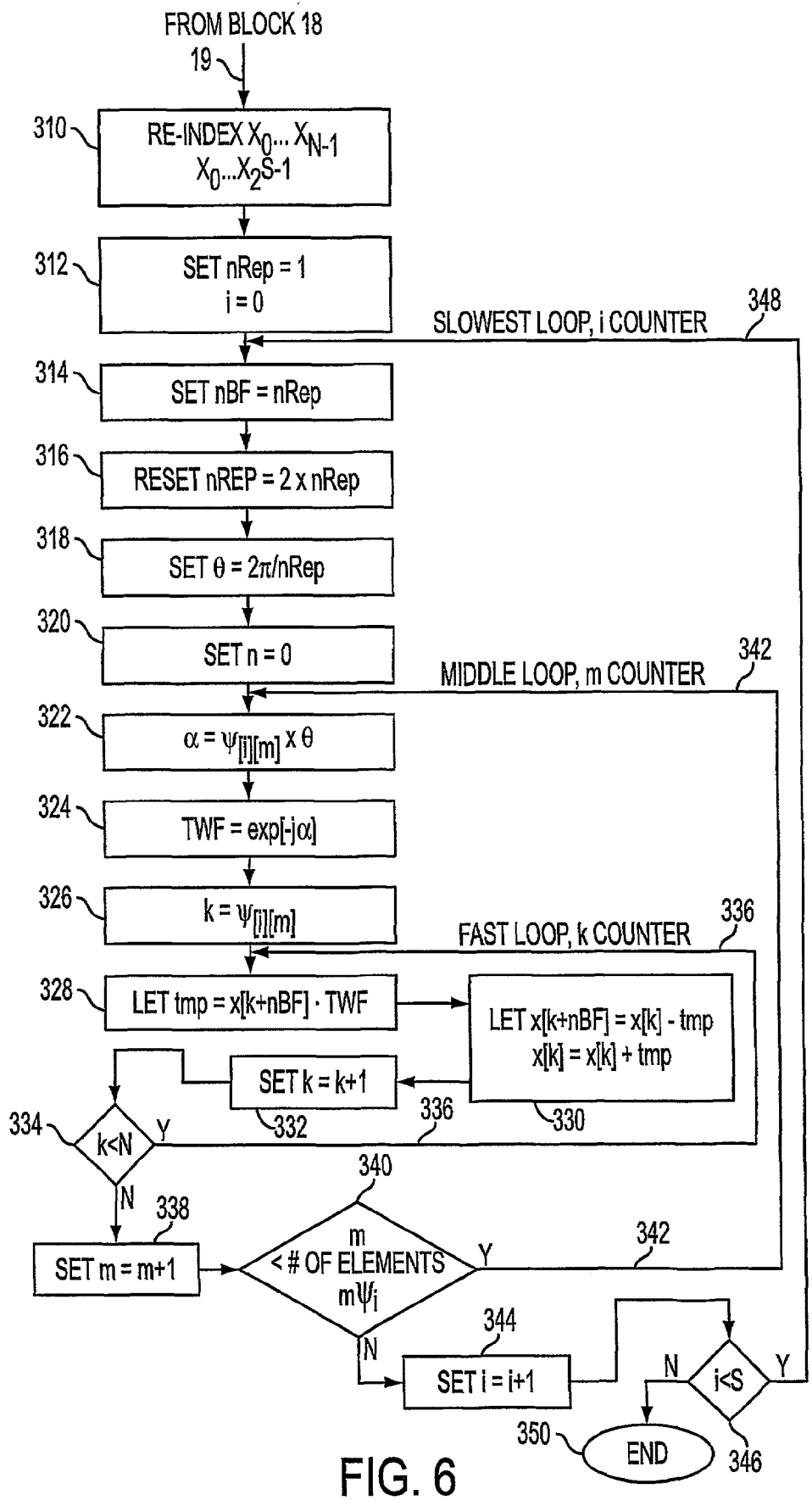
FIG. 6 is a simplified conventional logic flow chart of graph illustrating the logic flow for the generation of the FFT output by the traced FFT method of FIG. 4.

FIG. 6 is a simplified logic flow chart or diagram illustrating the operation of the traced FFT pruning BLOCK 20 of FIG. 4. In FIG. 6, the logic flow arrives over logic path 19 at a block 310, which represents the re-indexing of the input data sequence $x_0, \ldots, x_{N-1}$ to $$x_0, \ldots, x_{2^S-1} \qquad (5)$$

From logic block 310 of FIG. 6, the logic flows to a block 312, which represents the setting of variables nRep and i to nRep=1 and i=0. From logic block 312, the logic flows to a further block 314, representing the setting of the number of butterflies nBF equal to variable nRep. Block 316 represents the resetting of the value of nRep to double its current value, namely nRep=2 nRep. The doubling of nRep represents the angle of the twiddle factor for the current stage. In block 318, the value of θ is set to 2π/nRep. Block 320 represents the setting of n=0.

From block 320 of FIG. 6, the logic flows to a block 322, which represents the setting of α

$$\alpha = \Psi_{[i][m]}\Theta \qquad (6)$$

where $\Psi_{[i][m]}$ represents the $m^{\text{th}}$ element of $\Psi_i$. From block 322, the logic flows to a block 324, which represents the determination of the twiddle factor TWF=exp[−jα]. From block 324, the logic flows to a block 326, which represents the calculation of k=$\Psi_{[i][m]}$. From block 326, the logic flows to a further block 328, which represents the setting of a temporary variable tmp to tmp=x[k+nBF]·TWF. The next block, namely block 330, sets x[k=nBF]=x[k]−tmp
x[k]=x[k]+tmp From block 330, the logic flows to a block 332, increments the inner or fastest loop index k=k+1. From block 332, the logic proceeds to a decision block 334, which makes the comparison k<N, and if this is true, the logic leaves decision block 334 by the YES output, and proceeds by way of logic path 336 back to block 328, to recalculate the twiddle factor for the next value of k. Eventually, the fastest loop will have calculated all values of k up to N, and the logic will then leave decision block 334 by the NO output, and proceed to a block 338. Block 338 increments the value of running variable m, so that m=m+1. From block 338, the logic flows to a further decision block 340, which examines m. If the current value of m<number (#) of elements in $\psi_i$, the logic leaves decision block 334 by the YES output, and proceeds by way of loopback logic path 342 to block 322. From block 322, the logic proceeds through blocks 324, 326, 328, 330, and 332, recalculating for all values of m up to m=number of elements in $\psi_i$. When m=number of elements in $\psi_i$, the logic leaves decision block 340 by the NO output, and proceeds to a block 344, which represents the incrementing of variable i to i+1. Decision block 346 examines variable i, and returns the logic by way of loopback logic path 348 to block 314 to continue calculation. All the calculations are again performed for the current value of i so long as i<S. Eventually, the value of i will be equal to S, and the logic will then leave decision block 346 by the NO output and proceed to the END block 350, with all the FFT calculations having been made for one set of input data.

The results of the required output are in x[j], where j∈$O_S$.

The flow chart of FIG. 6 can be implemented in C language as

```
void TFFTP(int N, int s, int *indexSet[s], complex &x[N])
{   int i, j, j2, k;           //counters
    int nRep;                  //index spacing between adjacent butterfly
                               Group
    int numBFL;                //number of Butterflies per Group
    float twoPi;
    float ang;                 //twiddle factor unit phase
       float TWF;              //twiddle factor
    float c,s;                 //Cosine and Sine storage variable
    complex tempData;
    nRep=1,
    twoPi=2*3.14159265,
        for(i=0;i<s; i++)      //number of stages loop
        {
            numBFL=nRep;       //number of butterflies
            nRep=2*nRep;
            ang=twoPi/nRep;
              //Only the data in the list are calculated
              for (m = 0;
 indexSet[m][i]!=EndOfList:m++)
            {   //Calculate the twiddle factors
                j=indexSet[m][i];

TWF=ang*j;
                c=cos(TWF);
                s=sin(TWF);
                //update the data
                for (k=j; k<N; k+=nRep)
                {j2=k+numBFL;
                tempData=x(j2)*complex(c,s);
                x(j2)=x(k)−tempData;
                x(k)=x(k)+tempData;
                }
            }
        }
}
```

Figure 2A:
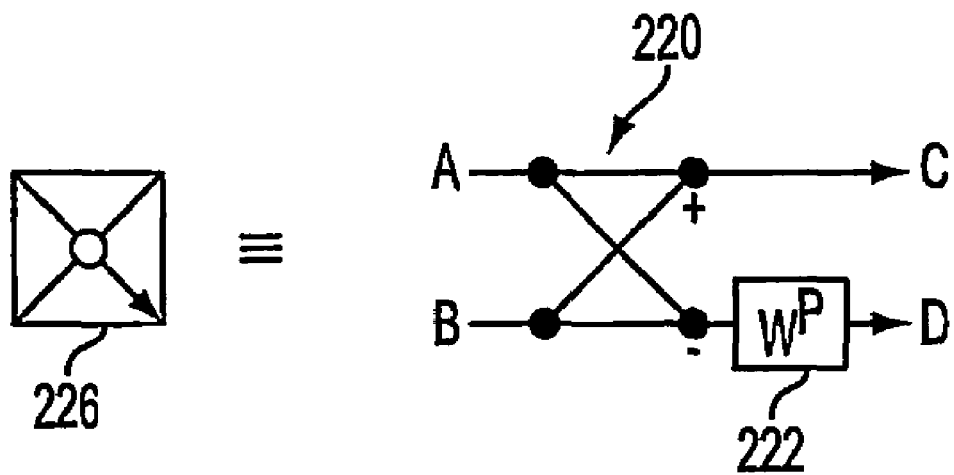
FIGS. 2a and 2b are simplified block diagrams illustrating two types of butterflies which may be used in the arrangement of FIG. 1, and also illustrating symbols therefor.
Figure 2B:
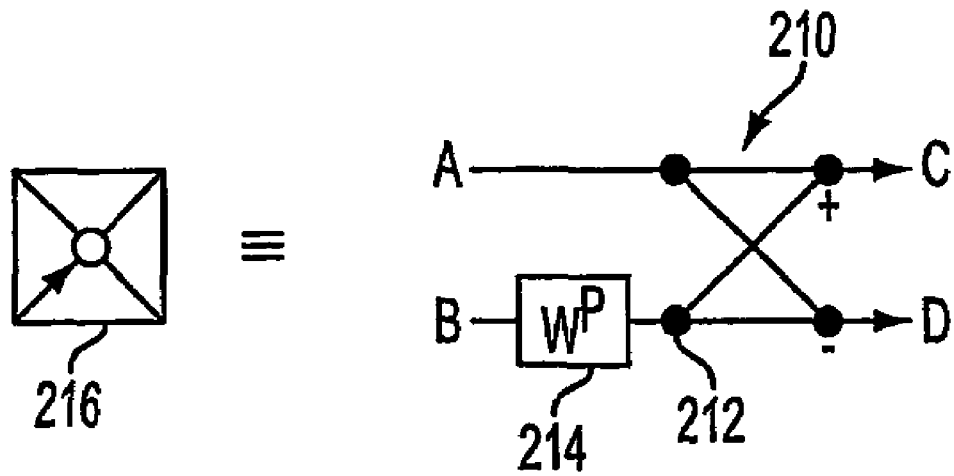
Figure 7:
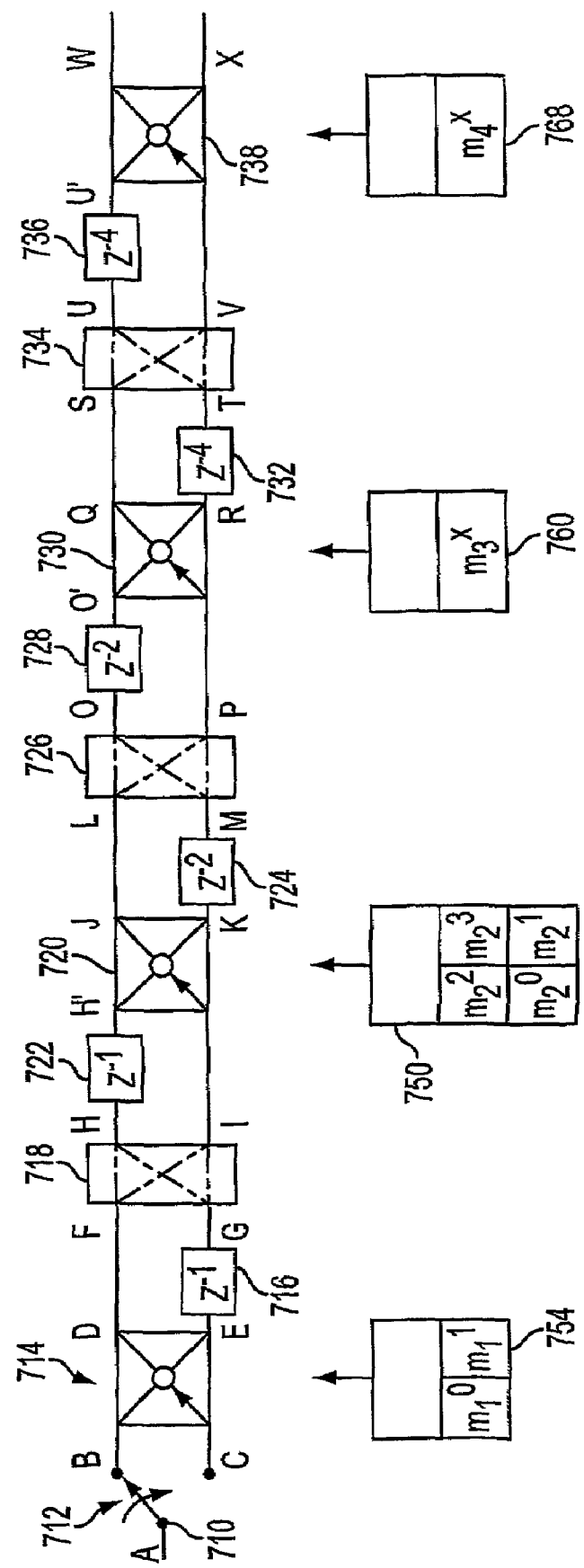
FIG. 7 is a simplified block diagram of a pipeline processor controlled according to an aspect of the invention for performing only those butterflies required for generating specified sparse outputs.

FIG. 7 is a simplified block diagram of a conventional four-butterfly pipeline processor for producing an FFT output signal in response to sixteen input signals applied to an input port 710 (location A). These input signals are illustrated in FIG. 8a as starting at time 0, and are in the form of a stream of numbers designated in FIG. 8a as 1, 2, 3, 4, 5, 6, 7, 8, 9, 10, 11, 12, 13, 14, and 15, corresponding to the input block of signals for a sixteen-point FFT. The signals are demultiplexed to locations B and C by a switch 712 operating at twice the system clock rate, with the resulting signal streams at locations B and C represented by the B and C signals of FIG. 8b. The signals at locations B and C of FIG. 7 are delayed by one clock cycle relative to the starting time 0, as a result of operation of the switch 712. The butterfly symbol 714 of FIG. 7 is identified in FIG. 2b. The division of the input signals of FIG. 8a into two associated groups designated A and B (at locations A and B of FIG. 7) corresponds to the grouping of input signals 0 through 15 in FIG. 1 into pairs for application to the butterflies of stage 1 of FIG. 1. More particularly, in FIG. 8b, the B,C pairs are pair 0,1; 2,3; 4,5; 6,7; 8,9; 10,11; 12,13; and 14,15, occurring sequentially, rather than in parallel. Physically, there is but a single input-stage butterfly in FIG. 7, which operates at the system clock rate. At the first local clock cycle, butterfly 714 of FIG. 7 processes input signals 0,1; at the second clock cycle, it processes input signals 2,3; at the third clock cycle, it processes input signals 4, 5, and so forth, taking eight local system clock cycles to process all of the sixteen input signals of FIG. 8a. The results of the butterfly operation by butterfly processor 714 appear at locations D and E of FIG. 7, as indicted in FIG. 8c. The indicated "start time" of "3" of FIGS. 8c and 8d assumes that there is a two-clock-cycle delay in traversing from location C to location D of butterfly 714 of FIG. 7. The lower branch output signal from butterfly 714 is delayed by one clock cycle in a delay ($Z^{-1}$) element 716. The signals at locations F and G of FIG. 7, then, are represented by FIG. 8d. In FIG. 8d, the upper branch is not illustrated as being delayed, but the lower branch is illustrated as delayed by one local clock cycle; that is to say, the numbers at the F location appears one clock cycle prior to (to the left of) G in FIG. 8d. The signals at locations F and G are applied to a switch illustrated as 718 in FIG. 7, which operates at half the local clock rate. Switch 718 has two states, namely straight-through coupling from F to H and from G to I, and criss-cross coupling from F to I and from G to H. In FIG. 8e, the uppermost or logic 1 level of the half-local-clock rate switch state represents straight-through operation of switch 718, and the logic-0 level of the signal of FIG. 8e represents criss-cross operation.

The criss-cross operation of switch 718 of FIG. 7 results in the coupling of signal 0 from F of FIG. 8d to H of FIG. 8f during the first switch clock logic high state of FIG. 8e, coupling of signal 2 from F of FIG. 8d to I of FIG. 8f and of signal 1 from G of FIG. 8d to H of FIG. 8f during the second switch clock cycle, coupling of signals 3 and 4 from locations G and F, respectively, to locations I and H, respectively, during the third switch clock cycle; the coupling of signals 6 and 5 from locations F and G, respectively, to locations I and H, respectively, the coupling of signals 7 and 8 from locations G and F, respectively, to locations H and I, respectively; the coupling of signals 9 and 10 from locations G and F, respectively, to locations H and I, respectively; the coupling of signals 11 and 12 from locations G and F, respectively, to locations I and H, respectively; the coupling of signals 13 and 14 from locations G and F, respectively, to locations H and I, respectively; and the coupling of signal 14 from location G to location I, during subsequent clock cycles of FIG. 8e, as illustrated in FIGS. 8d, 8e, and 8f.

The signals at location H at the upper output of switch 718 of FIG. 7 are coupled to a location H' at an input of a further pipeline butterfly 720 by way of a one-local-clock delay element 722, and the signals at location I are coupled to the other input port of pipeline butterfly 720 without delay. It will be noted that there is a one-clock delay 716 between locations G and E, and another between locations H and H', so the delays tend to "cancel" to thereby bring signals simultaneously applied to locations B and C of FIG. 7 into time alignment at locations H' and I. The time-aligned signals are applied to butterfly processor 720 of FIG. 7, to produce processed signals at locations J and K, as illustrated in FIG. 8g. Locations J and K of FIG. 7 are delayed by two local clock cycles relative to locations H' and I. Referring to FIG. 8g, the starting time is indicated as being the 6th clock cycle.

In FIG. 7, a two-clock-cycle ($Z^{-2}$) delay 724 is interposed between locations K and M, and no further delay is placed between locations J and L. Consequently, a net two-clock delay is introduced, which is suggested by the start time of "8" in FIG. 8h. More particularly, the signals at location L are equated to those at J, and the signals at M are delayed by two clock periods relative to those at location K. In FIG. 7, the signals at locations L and M are applied to a criss-cross switch 726, which is controlled by the signal of FIG. 8i in the same manner as switch 722 is controlled by the signal of FIG. 8e, but at a rate equal to ¼ the local clock rate. This criss-cross switching results in the coupling of signal to locations O and P as illustrated in FIG. 8j. More particularly, during the first half-cycle of the switch control clock of FIG. 8i, signals 0 and 1 at location L are coupled to location O. During the second half-cycle of control 8i, signals 4 and 5 at location L are coupled to P, and signals 2 and 3 at location M are coupled to location O. During the third half-cycle of control signal 8i, signals 6,7 at location M are coupled to P and signals 8,9 at location L are coupled to O. During the fourth half-cycle of switch 726 control signal 8i, signals 10, 11 at location M are coupled to O, and signals 12, 13 at location L are coupled to P.

In FIG. 7, the signal at location O is coupled to location O' by way of a further two-local-system-clock cycle delay ($Z^{-2}$) designated 728. No delay is interposed in the path associated with location P. As a result, the signals arriving at the input nodes or ports of butterfly processor 730 have no relative delay. Again, butterfly processor 730 is assumed to have a two-local-system-clock delay, which introduces no relative delay between the two paths. Consequently, the signals arriving at butterfly output locations Q and R of FIG. 7 are as illustrated in FIG. 8k. Signal at location R of FIG. 7 is coupled to location T by way of a four-cycle ($Z^{-4}$) delay 732, with the result that the signal arriving at location S of FIG. 7 is advanced relative to the signal arriving at location T by four clock cycles, as illustrated in FIG. 8f. The indicated start time in FIG. 8l IS "12." The signals at locations S and T are applied to a criss-cross switch 734, which operates under the control of the control signal illustrated in FIG. 8m to couple the signals 0, 1, 2, 3 from location S to location U, signals 8, 9, 10, and 11 from location S to location V, signals 4, 5, 6, and 7 from location T to location U, and signals 12, 13, 14, and 15 from location T to location V, as illustrated in FIGS. 8l, 8m, and 8n. A further four-clock-cycle delay element 736 delays the U signal proceeding to the input U' of butterfly processor 738, to thereby bring the signals applied to butterfly processor 738 into temporal alignment, so that signal sets 0,8; 1,9; 2,10; 3,11; 4,12; 5,13; 6,14; and 7,15 are temporally aligned for application to the input ports of butterfly processor 738. Finally, butterfly processor 738 processes the fourth stage of FFT and produces the signal set of FIG. 8o at its outputs W and X.

In general, control of a particular stage of the arrangement of FIG. 7 is based upon an index $\Psi_x$, where x represents the next-higher stage of butterflies of FIG. 3. Thus, control of the first stage butterfly 714 of FIG. 7 by controller 754 uses the second-stage butterfly index 1 described in conjunction with FIG. 5, control of the second stage butterfly 720 of FIG. 7 by controller 750 uses the third-stage butterfly index $\Psi_2$, and control of the third stage butterfly 726 of FIG. 7 by controller 760 uses the fourth- or last-stage butterfly index $\Psi_3$. The last stage pipeline butterfly of FIG. 7, namely butterfly 738, is controlled by controller 768 using the selected output bin index $O_S$, which in the case of the four-butterfly pipeline of FIG. 7 is $O_4$.

In FIG. 7, blocks 754, 750, 760, and 768 represent controllers for controlling the operation of pipeline butterfly stages 718, 720, 730, and 738, respectively, in accordance with an aspect of the invention. FIG. 9 is a simplified diagram in block and schematic form illustrating the j$^{\text{th}}$ stage of DIF butterfly and its control arrangement. First-stage controller 754 contains two one-bit control memories $m_1^0$ and $m_1^1$, where the subscript refers to the stage number, and the superscript 0 represents control of the adder in the associated butterfly, and the superscript 1 represents control of the subtractor. Similarly, controller 750 controlling the second-stage pipeline butterfly 720 contains four one-bit memories $m_2^0$, $m_2^1$, $m_2^2$, $m_2^3$, which control adders, subtractors, and multipliers of the butterfly of the second stage. Controller 760 controlling the third-stage pipeline butterfly 730 contains eight one-bit memories $m_3^0$, $m_3^1$, $m_3^2$, $m3_2^3$, $m_3^4$, $m_3^5$, $m_3^6 m_3^7$, designated together as $m_3^x$ which control adders, subtractors, and multipliers of the butterfly of the third stage, and controller 768 controlling the fourth-stage pipeline butterfly 730 contains sixteen one-bit memories $m_4^0$, $m_4^1$, $m_4^2$, $m3_4^3$, $m_4^4$, $m_4^5$, $m_4^6$, $m3_4^7$, $m_{m34}^{11}$, $m_4^{12}$, $m_4^{13}$, $m_4^{14}$, $m_4^{15}$, designated jointly as $m_4^x$, which control adders, subtractors, and multipliers of the butterfly of the fourth stage.

The values contained in the memories may be fixed during computations if the output bin set is defined and remains unchanged from time to time. The values contained in the memories may require updating from time to time if the output bin set changes from time to time.

In general, the one-bit memories of controllers 754, 750, 760, and 768 of FIG. 7 are designated by $m_{stage\ number\ j}^{memory\ member\ i}$ or $m_j^i$. In general, the memory controls the subtractor when $$2^{j-1} \leq i \leq 2^j - 1,$$

the memory controls the adder when $$0 \leq i \leq 2^{S-1} - 1, \text{ and}$$

the Boolean sum of the signal or bit stored in memory pair $$m_j^i, m_j^{i+2^{j-1}} \quad (7)$$

controls the multiplier, where $0 \leq i \leq 2^{j-1}$.

The following table represents the translation between $\Psi_2$ and $m_1^0$, $m_1^1$, meaning that it relates to the application of the second-stage butterfly index set to the first stage control memory.

| | |
|---|---|
| $\Psi_1$ = null | $m_1^0 = 0, m_1^1 = 0$ |
| $\Psi_1$ = {0} | $m_1^0 = 1, m_1^1 = 0$ |
| $\Psi_1$ = {1} | $m_1^0 = 0, m_1^1 = 1$ |
| $\Psi_1$ = {0,1} | $m_1^0 = 1, m_1^1 = 1$ |

If the bracketed index {} contains butterfly index k, then $m_1^k = 1$, else $m_1^k = 0$.

Figure 9A:
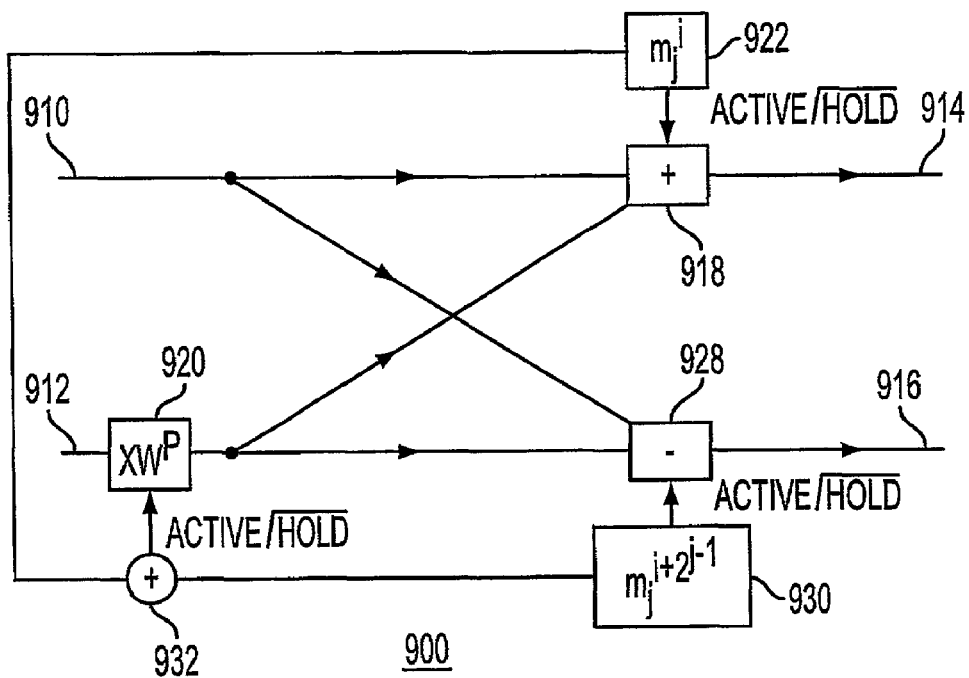
FIGS. 9a and 9b are simplified block diagrams of controllers or control systems for generating processor control signals for DIT and DIF pipelined FFT processing, respectively.
Figure 9B:
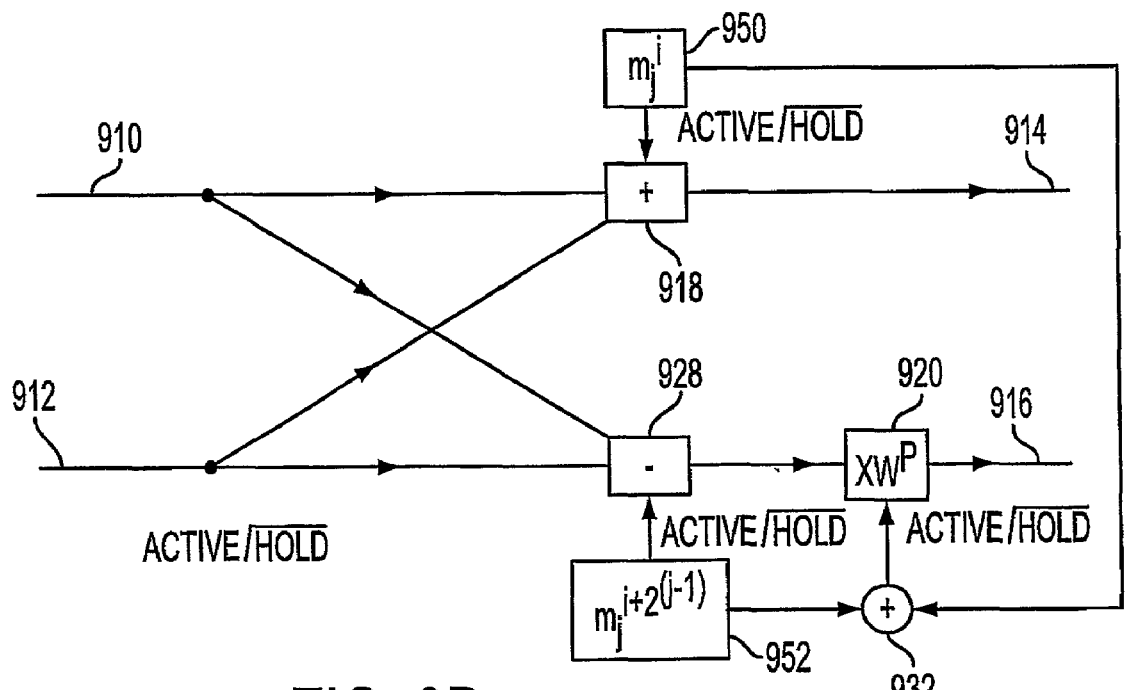

FIGS. 9a and 9b are simplified block diagrams of a system for generating control signals for the various butterfly processors of FIG. 7, so as to cause the pruned or reduced-processing operation according to an aspect of the invention. More particularly, FIG. 9a is a system for controlling in a DIT-type processor, and FIG. 9b represents a system for controlling a DIF type processor.

In FIG. 9a, the butterfly nodes are designated as 910, 912, 914, and 916. The signal applied to input node or port 912 is multiplied by a weighting factor $W^P$ in a multiplier 920. An adder 918 is coupled to input node 910 and to the output port of multiplier 920, for adding together the signals therefrom, under the control of the contents from $m_j^i$ memory 922. A subtractor 928 is coupled to receive signal from input node 910 and from the output of multiplier 920, for subtracting the two signals under the control of $m_j^Y$ memory 930, where $Y=(i+2^{j-1})$. The weighting multiplication performed in multiplier 920 is controlled by the output of a Boolean summing circuit 932, which receives as its input signals the sum of $m_j^i$ and $m_j^Y$. One bit controls multiplier 932 to the active or idle state (hold overbar). In the active state, the input signal from port 912 is multiplied by the specified weight, and in the idle mode, it simply holds its previous value. This previous value is not used, so may be considered to be garbage. More particularly, if the one-bit memory signals produced by memories 922 and 930 of FIG. 9a are both 0, their sum is 0, and the multiplier assumes its idle state. If either or both of the one-bit memory output signals are 1, their sum is considered to be 1, and multiplier 920 assumes its active state. Similarly, adder 918 and subtractor 920 are active when their control signals are logic high, and inactive or idle when their control signals are low.

The DIF butterfly of FIG. 9b includes elements corresponding to those of FIG. 9a, and these elements are designated by the same reference numerals. In FIG. 9b, the signals applied to input ports 910 and 912 are applied to summer 918 and to subtractor 928. The output signal of adder 918 is coupled directly to output port 914, and the output signal from subtractor 928 is applied to a weighting multiplier 920. The multiplied output signal from multiplier 920 is applied to output port 916. Summing circuit 918 is controlled by the $m_j^i$ signal from a memory 950, and subtracting circuit 928 is controlled by the $m_j^{i+2(j-1)}$ signal from a memory 952. The memory outputs are also applied to an adding circuit or adder 932, the output of which controls the weighting multiplier 920.

The timing of the controls of FIGS. 9a and 9b must take into account that the pipeline processor with which it is to be used has j stages, as indicated by the j subscripts of the memory indices. The jth stage control block (including memories 922, 930, and summing circuit 932) count the local system clock by $2^{j-1}$. During the first clock cycle, the contents from $m_j^0$ 922 and its paired element $m_j^Y$ 930, where $Y=2^{j-1}$, are loaded into the two memories 922 and 930.

Figure 10:
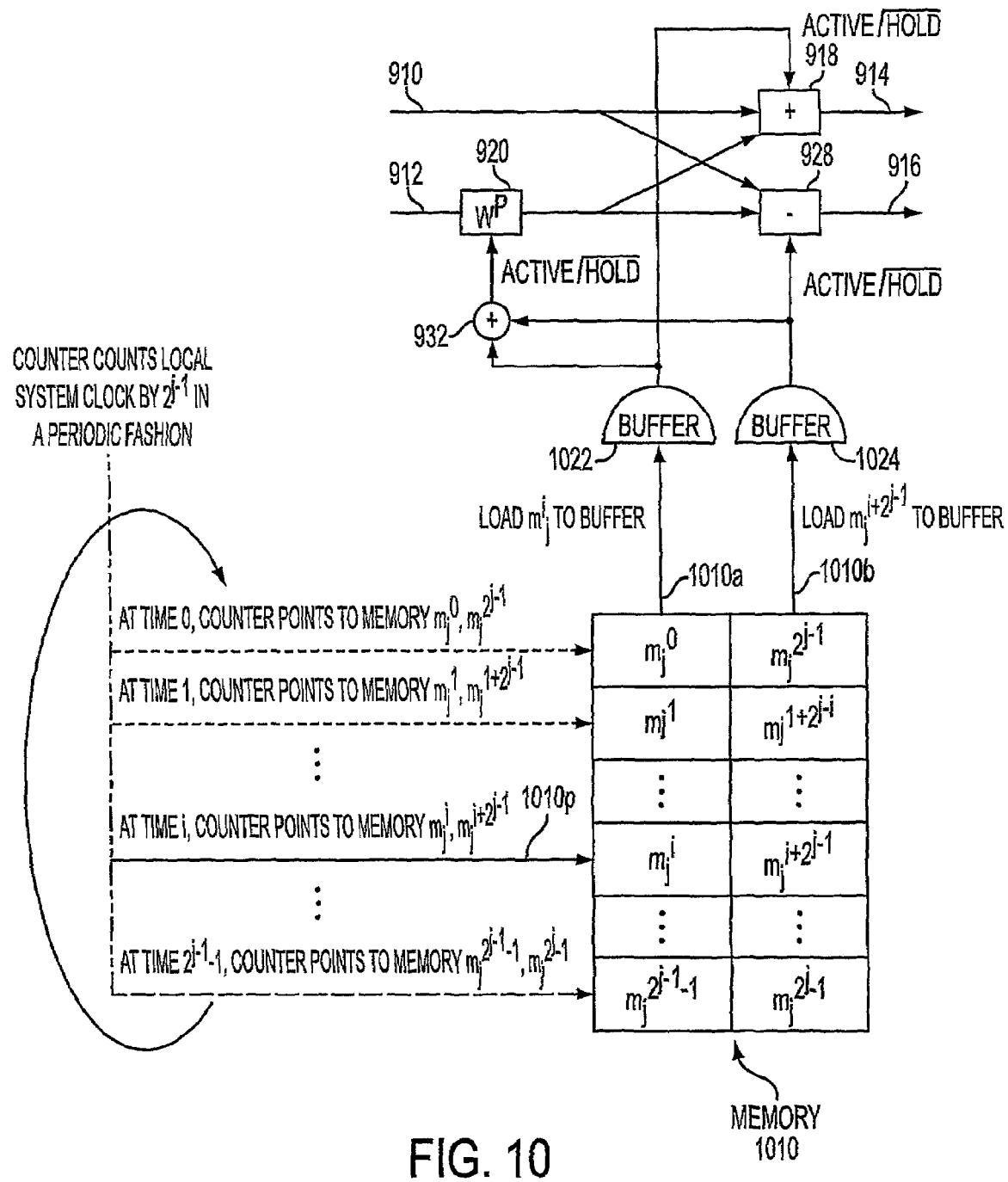
FIGS. 10 and 11 are illustrations of how the $i^{th}$ stage of butterfly is controlled in the DIT and DIF processors of FIGS. 9a and 9b, respectively.

The arrangement of FIG. 10 is a simplified representation of the jth stage of DIT butterfly, including details of the control. In FIG. 10, elements corresponding to those of FIG. 9a are designated by like reference numerals. In FIG. 10, control of summing circuit 918 is provided by a buffer designated 1022, and control of summing circuit 928 is provided by a buffer designated 1024. Buffers 1022 and 1024 received their input signals from a memory designated generally as 1010, which in general produces two outputs at a time, namely those applied to buffers 1022 and 1024 from memory output ports 1010a and 1010b. The output signal produced by memory 1010 at its output ports 1010a and 1010b is controlled by a pointer, illustrated as 1010p, which at any given time points to or addresses one pair of memory locations, so as to select the signals stored in that memory location for coupling to the output ports. The pointer is controlled by a simple counter, which counts the local clock by $2^{j-1}$ in a periodic fashion. At time or clock cycle 0, the counter-controlled pointer points to memory addresses $m_j^1$ and $m_j^Y$, where $Y=2^{j-1}$. At time 1, the pointer points to $m_j^1$ and $m_j^{1+Y}$, again where $Y=2^{j-1}$. At a later time i, the pointer 1010p points to $m_j^i$ and $m_j^{i+Y}$. Finally, just before the count turns over, the pointer 1010p points to the memory addresses represented by $m_j^{Y-1}$ and $m_j^{Y-1}$. This control provides the proper timing for pruned operation in accordance with an aspect of the invention.

Figure 11:
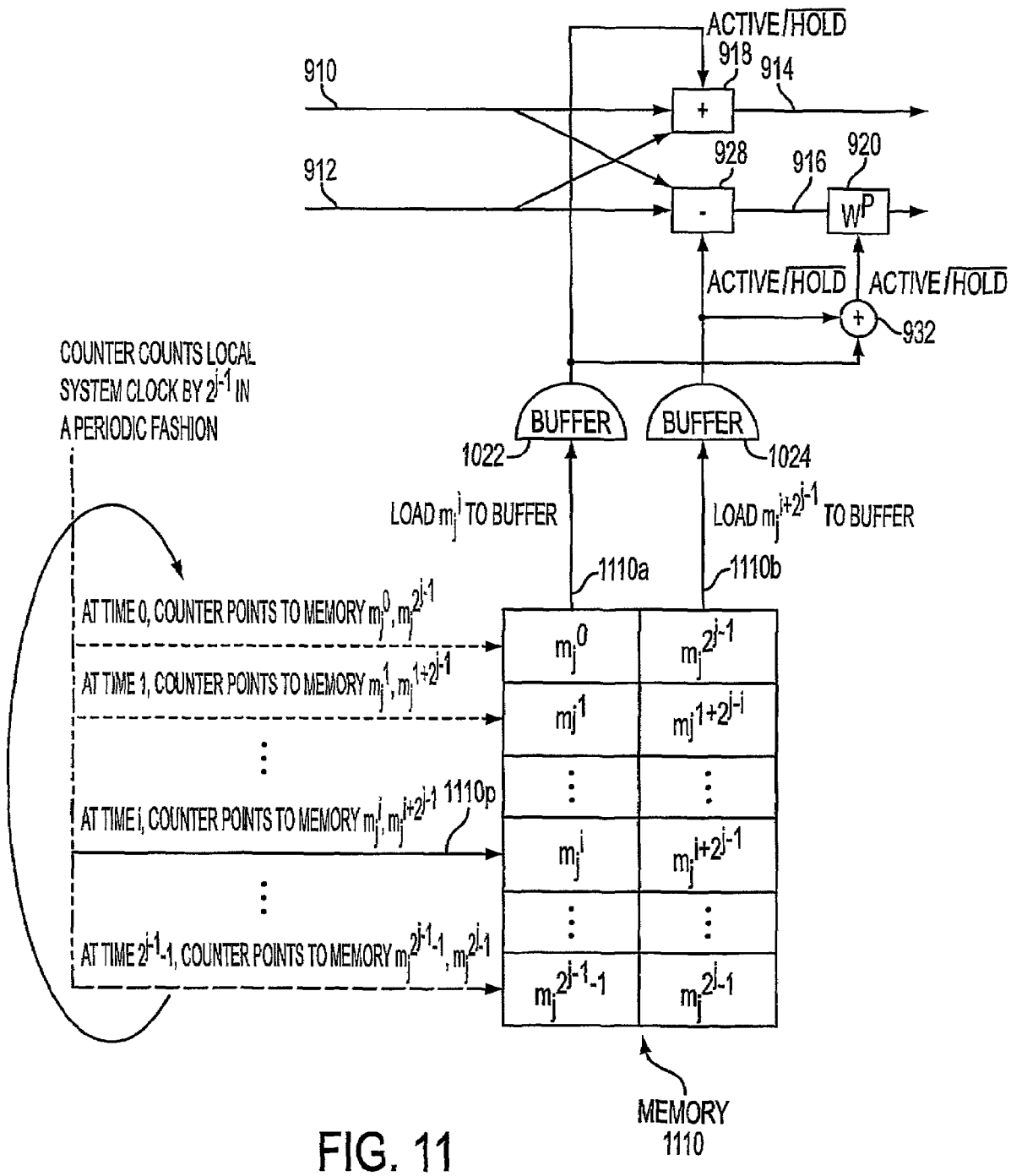

The arrangement of FIG. 11 is a simplified representation of the j$\underline{th}$ stage of DIF butterfly, including details of the control. In FIG. 11, elements corresponding to those of FIG. 9b are designated by like reference numerals. In FIG. 11, control of summing circuit 918 is provided by the buffer designated 1022, and control of summing circuit 928 is provided by the buffer designated 1024. Buffers 1022 and 1024 received their input signals from a memory designated generally as 1110, which in general produces two outputs at a time, namely those applied to buffers 1022 and 1024 from memory output ports 1110a and 1110b. The output signal produced by memory 1110 at its output ports 1110a and 1110b is controlled by a pointer, illustrated as 1110p, which at any given time points to or addresses one pair of memory locations, so as to select the signals stored in that memory location for coupling to the output ports. The pointer 1110p is controlled by a simple counter, which counts the local clock by $2^{j-1}$. At time or clock cycle 0, the counter-controlled pointer 1110p points to memory addresses $m_j^0$ and $m_j^Y$, where $Y=2^{j-1}$. At time 1, the pointer points to $m_j^1$ and $m_j^{1+Y}$, again where $Y=2^{j-1}$. At a later time i, the pointer 1110p points to $m_j^i$ and $m_j^{i+Y}$. Finally, just before the count turns over, the pointer 1110p points to the memory addresses represented by $m_j^{Y-1}$ and $m_j^{Y-1}$. This control provides the proper timing for pruned operation in accordance with an aspect of the invention.

Mapping from j+1$\underline{th}$ stage butterfly index set $\Psi_j$ to j$\underline{th}$ stage memory bits $M_j^i$ ($1 \leq j \leq S-1$, $0 \leq i \leq 2^{j-1}-1$) is determined by
(a) for ($1 \leq j \leq S-1$), (for stage j)
 (i) if ($k \epsilon \Psi_j$) or $\Psi_j$ contains index k, then $m_j^k=1$.
 (ii) if ($k \notin \Psi_j$), then $m_j^k=0$.
(b) for j=S, (for stage S or the last stage)
 (i) if ($k \epsilon O_S$), or $O_S$ contains index k, then $m_j^k=1$.
 (ii) if ($k \notin O_S$), then $m_j^k=1$.

Control of the memory pair is determined at stage j by $m_j^i$ ($0 \leq i \leq 2^{j-1}-1$) and $m_j^{i+Y}$, ($Y=2^{j-1}$). When $0 \leq i \leq (2^{j-1}-1)$, $m^i$ controls the butterfly adder, and its pair memory element $m_j^{i+y}$ controls the butterfly subtractor. The butterfly multiplier is controlled in accordance with the Boolean OR of $m_j^i$ and $m_j^{i+Y}$ $$m_j^i \oplus m_j^{i+2^{(j-1)}} \qquad (8)$$

Timing for control of the loading of the memory contents for $m_j^{i+Y}$ at the j$\underline{th}$ stage butterfly is determined by counting the system clock at the j$\underline{th}$ stage by $2^{j-1}$; at the first system clock, the contents of memories $m_j^0$ and $m_j^Y$ are loaded to control the butterfly. At the second system clock, the contents of memories $m_j^1$ and $m_j^{Y-1}$ are loaded to control the butterfly. This process continues from clock cycle to clock cycle, until, at the $(2^{j-1})\underline{th}$ clock cycle, the contents of memories $m_j^n$ and $m_j^{Y-1}$ are loaded to control the butterfly. The process repeats by loading the contents of memories $m_j^0$ and $m_j^Y$ for the next system clock, and so on.

Other embodiments of the invention will be apparent to those skilled in the art. For example, the digital data may be in serial or parallel form. The algorithm can also be applied to parallel pipeline processing. The algorithm, with minor modification, can be applied to non-radix-2 applications, such as radix 4 and the prime-number radix FFT.

What is claimed is:

1. A computer readable medium including a program having instructions, which when executed perform a radix 2 fast fourier transform on a digital series to produce signals in cyclically noncontinuous output bins that are useable in demultiplexing carrier signals, the instructions comprising: determining the number $2^s$ of FFT points, the output bin index $O_s$, and the input signal array; determining the butterfly index for the last stage by $$\Psi_{S-1} = O_S \% \left(\frac{N}{2}\right)$$

determining the butterfly index for each stage other than said last stage by $$\Psi_{l-1} = \Psi_l \% \left(\frac{N}{2^{S-l+1}}\right)$$

where % means modulo operation and where l varies from 1 to (S−1);
 using said butterfly index, calculating only those butterflies necessary for calculation of the output bins,
 providing to storage or further processing said signals in cyclically noncontinuous output bins, and
 applying said signals from said cyclically noncontinuous output bins to demultiplexing at least one carrier.

2. The computer readable medium according to claim 1, wherein said determining the butterfly index for all later stages is performed in numerical order.

3. The computer readable medium according to claim 2, wherein said numerical order is ascending order.

4. The computer readable medium according to claim 1, further including the determination of output bins, wherein:
 for stage l, where l varies from 1 to S executing only that butterfly in the butterfly index set $\Psi_{l-1}$ of that stage;
 for stage l, loading the twiddle factor corresponding to the butterfly index set $\Psi_{l-1}$ of that stage; and
 repeating (a) executing only tat butterfly in the butterfly index set $\Psi_{l-1}$ of that stage and (b) loading the twiddle factor corresponding to the butterfly index set $\Psi_{l-1}$ of that stage, until the required final stage butterflies are executed and the required output bins are filled.

5. The computer readable medium according to claim 4, wherein setting the butterfly index includes, when $0 \leq i \leq (2^{j-1}-1)$:
 controlling the butterfly adder with $m_j^i$
 controlling the butterfly subtractor with $m_j^{i+Y}$; and
 controlling the butterfly multiplier in accordance with the Boolean OR of $m_j^i$ and $m_j^{i+Y}$.

6. The computer readable medium according to claim 1, wherein using said butterfly index further comprises:
 setting the butterfly index set $\Psi_j$ where ($1 \leq j \leq S-1$) and the selected output node index set ranges from $O_s$ to $M_s^i$ by
 (a) for ($1 \leq j \leq S-1$)
  (i) if ($k \epsilon \Psi_j$) or $\Psi_j$ contains index k, then setting $m_j^k=1$,
  (ii) if ($k \epsilon \Psi_j$), then setting $m_j^k=0$
 (b) for j=S
  (i) if ($k \epsilon O_s$), or $O_s$ contains index k, then setting $m_j^k=1$
  (ii) if ($k \notin O_s$), or $O_s$, then setting $m_j^k=1$; and
 controlling of a memory pair stage j by $m_j^i$ ($0 \leq i \leq 2^{j-1}-1$) and $m_j^{i+Y}$, ($Y=2^{j-1}$).

7. A method for producing signals in cyclically noncontinuous output bins that are useable in demultiplexing carrier waves, the method comprising:
 determining the number $2^s$ of FFT points, the output bin index $O_s$, and the input signal array;

determining the butterfly index for the last stage by $$\Psi_{S-1} = O_S \ \% \ \left(\frac{N}{2}\right)$$

determining the butterfly index for each stage other than said last stage by $$\Psi_{l-1} = \Psi_l \ \% \ \left(\frac{N}{2^{S-l+1}}\right)$$

where where % means modulo operation and varies from 1 to (S−1);
   using said butterfly index, calculating only those butterflies necessary for calculation of the output bins,
   providing to storage or further processing said signals in cyclically noncontinuous output bins, and
   applying said signals from said cyclically noncontinuous output bins to demultiplexing at least one carrier wave.

8. The method according to claim 7, wherein said determining the butterfly index for all later stages is performed in numerical order.

9. The method according to claim 8, wherein said numerical order is ascending order.

10. The method according to claim 7, further including the determination of output bins, wherein:
   for stage l, where l varies from 1 to S, executing only that butterfly in the butterfly index set $\Psi_{l-1}$ of that stage;
   for stage l, loading the twiddle factor corresponding to the butterfly index set $\Psi_{l-1}$ of that stage; and
   repeating (a) executing only that butterfly in the butterfly index set $\Psi_{l-1}$ of that stage and (b) loading the twiddle factor corresponding to the butterfly index set $\Psi_{l-1}$ of that stage, until the
   required final stage butterflies are executed and the required output bins are filled.

* * * * *